(12) United States Patent
Hietalahti et al.

(10) Patent No.: US 9,253,805 B2
(45) Date of Patent: Feb. 2, 2016

(54) WIRELESS DEVICE, NETWORK AND METHODS

(71) Applicant: Broadcom Corporation, Irvine, CA (US)

(72) Inventors: Hannu Petri Hietalahti, Kiviniemi (FI); Matti Moisanen, Oulu (FI); Samuli Heikkinen, Oulu (FI)

(73) Assignee: BROADCOM CORPORATION, Irvine, CA (US)

( * ) Notice: Subject to any disclaimer, the term of this patent is extended or adjusted under 35 U.S.C. 154(b) by 134 days.

(21) Appl. No.: 13/900,064

(22) Filed: May 22, 2013

(65) Prior Publication Data

US 2013/0315072 A1 Nov. 28, 2013

(30) Foreign Application Priority Data

May 22, 2012 (GB) .................................. 1209029.6

(51) Int. Cl.
*H04W 76/02* (2009.01)
*H04W 48/00* (2009.01)
*H04W 48/16* (2009.01)
*H04W 48/18* (2009.01)
*H04W 60/00* (2009.01)

(52) U.S. Cl.
CPC .............. *H04W 76/02* (2013.01); *H04W 48/00* (2013.01); *H04W 48/16* (2013.01); *H04W 48/18* (2013.01); *H04W 60/00* (2013.01)

(58) Field of Classification Search
None
See application file for complete search history.

(56) References Cited

U.S. PATENT DOCUMENTS

2013/0157661 A1* 6/2013 Bhaskaran et al. ........... 455/436

* cited by examiner

*Primary Examiner* — John Blanton
(74) *Attorney, Agent, or Firm* — Foley & Lardner LLP; Christopher J. McKenna; Daniel E. Rose

(57) ABSTRACT

Apparatus, methods, and computer programs are disclosed that include sending an update message to a core network by a voice centric user equipment coupled to a legacy access network supporting circuit switched voice service, receiving an updating accept message containing a status report of possible enhanced network capabilities of a non-legacy access network, and, in response to receiving the status report of possible enhanced network capabilities, determining whether to enable the non-legacy access network.

31 Claims, 6 Drawing Sheets

WIRELESS DEVICE, NETWORK AND METHODS

CROSS-REFERENCE TO RELATED APPLICATION

This application claims the benefit under 35 USC 119(a) and 37 CFR 1.55 to UK Patent Application No. 1209029.6 filed on May 22, 2012, the entire disclosure of which is incorporated herein by reference.

TECHNICAL FIELD

The present invention relates to a wireless device, a network, computer programs and methods. The example and non-limiting embodiments of this invention relate generally to wireless communication systems, methods, devices and computer programs, and, in particular examples, relate to providing reactivation of an evolved UMTS terrestrial radio access network (E-UTRAN) to maintain voice services and/or data services.

BACKGROUND

The following abbreviations which may be found in the specification and/or the drawing figures are defined as follows:
AN Access Network
ARP Allocation and Retention Policy
BTS Base Transceiver Station
CS Circuit Switch
CSFB Circuit Switch Fallback
E-UTRAN Evolved Universal Terrestrial Radio Access Network
ECM EPS Connection Management
EDGE Enhanced Data Rates for Global Evolution
EMM EPS Mobility Management
eNode B Evolved Node B
EPC Evolved Packet Core Network
EPS Evolved Packet System
ESM EPS Session Management
GERAN GSM-Enhanced Data Rates for Global Evolution (EDGE) RAN
GBR Guaranteed Bit Rate
GSM Global System for Mobile Communications
IMS IP multimedia subsystem
LA Location Area
L-GW Local PDN Gateway
LIPA Local IP Access
MBR Maximum Bit Rate
M-TMSI M-Temporary Mobile Subscriber Identity
MME Mobility Management Entity
NodeB Node B
PCRF policy and charging rules function
PDB Packet Delay Budget
PDCP Packet Data Convergence Protocol
PDN-GW Packet Data Network Gateway
PEER packet error loss rate
QCI QoS Class Identifier
QoS Quality of Service
RAN Radio Access Network
RLC Radio Link Control
RNC Radio Network Controller
RRC Radio Resource Control
SDU Service Data Unit
S-TMSI S-Temporary Mobile Subscriber Identity
SAE System Architecture Evolution
SRVCC Single Radio Voice Call Continuity
TA Tracking Area
TAC Tracking Area Code
TAI Tracking Area identity
TAU Tracking Area Update Long Term Evolution (LTE) and Long Term Evolution-Advanced (LTE-A), as specified in the 3rd Generation Partnership Project (3GPP), are all-Internet protocol (IP) technologies which are among the ongoing enhancements to the Universal Mobile Telecommunications System (UMTS) referred to as the Evolved UNITS Terrestrial Radio Access Network (E-UTRAN). Voice service in E-UTRAN is provided by way of voice-over-IP employing an IP multimedia subsystem (IMS) (referred to as "voice-over-LTE" (VoLTE)). Migration from legacy networks, such as 2G/3G/1xRTT networks employing circuit switch (CS) voice service, to a full-blown VoLTE employing packet switch (PS) voice service is not likely to occur in the near future. One interim solution is to utilise the circuit switch fall back (CSFB) mechanism which was introduced in 3GPP Rel-8. Another interim solution employs a single radio voice call continuity mechanism which was subsequently introduced in 3GPP Rel-9.

CSFB allows a user equipment (UE) registered with a public land mobile network (PLMN) to access (E-UTRAN) via the evolved packet system (EPS) to reuse CS domain services (i.e. voice services). This is applicable for example in a situation where the E-UTRAN access network does not support IMS services. In such a situation, where the UE is CSFB capable and the core network (CN) supports this functionality, the UE can switch its radio access technology (RAT) from E-UTRAN access to legacy RATs (e.g. GERAN/UTRAN/1xRTT access) which support CS domain services. Under certain circumstances, the UE employing the CSFB mechanism can maintain both voice services and data services simultaneously (including short messaging service (SMS). In certain 3G (UTRAN) scenarios, however, there would be a significant downgrade of any LTE data sessions. In a scenario involving fall back of the UE to the CS domain where a 2G/GERAN or 1XRTT (CDMA2000®) access network is employed, data services (including SMS) will likely degrade or suspend altogether.

Referring to FIG. 1, the EPS architecture for CWFB (100) showing the interconnection of a packet switched (PS) and CS domains for voice services and short message service (SMS) is illustrated as known in the prior art. As shown in FIG. 1, UE 110 has several radio frequency (RF) interfaces at its disposal, such as (i) a LTE-Uu radio interlace for connectivity between the UE 110 and an eNodeB (not shown) in the E-UTRAN access network 120; (ii) to Uu radio interface for connectivity between UE 110 and a NodeB (not shown) and RNC (not shown) in a legacy UTRAN access network 124, and (iii) a Um radio interface for connectivity between UE 110 and a legacy global system for mobile (GSM) communication/EDGE radio access network 122.

In order to allow the UE 110 access to GERAN 122 or UTRAN 124 for voice service via the CS domain, an SGs interface is deployed between the mobile switching centre (MSC) 142 and the mobile management entity (MME) 130. MSC 142 also acts as the gateway to fixed-line networks, such as a public switched telephone network (PSTN), and/or an integrated services digital network (ISDN) and the like. The S1-MME interface is provided for logical connectivity between UE 110 via access network (E-UTRAN 120) and the non-access stratum (NAS) via MME 130 as a function of the EPC procedures. UTRAN 124 connectivity with MSC 142 for the CS domain is provided by interface Iu-cs. The serving GPRS support node (SGSN) 144 via the GS interface and the S3 interface provide connectivity to the PS domain for UTRAN 124 (by way of a serving gateway (S-GW)) and packet data network gateway (PDN-GW) not shown)). GERAN 122 connectivity with MSC 142 for the CS domain is provided by interface A, and limited PS domain access is provided via the Gb interface by way of SGSN 144.

SRVCC is a further function of EPS that allows VoLTE voice service in the PS domain to be handled by a legacy access network (e.g. GERAN/UTRAN/1xRTT). To that end, SRVCC provides for the transition of a voice call from the PS domain (VoIP/IMS) in the registered PLMN to a legacy access network operating in the CS domain. In SRVCC, the network and UE is required to be SRVCC-capable and engaged in a voice call. The SRVCC-capable UE determines that it is moving away from an E-UTRAN supporting VoLTE and notifies the network via the MSC which then moves the UE to the legacy access network in the CS domain.

Currently, if IMS (VoLTE), the SRVCC mechanism and the CSFB mechanism are not available due to various temporary network problems, a UE may be required to disable E-UTRAN network access to maintain only GERAN or UTRAN access to the network. In such a situation, the UE temporarily camped on the legacy access network cannot automatically reactivate E-UTRAN to access data services or benefit from such enhanced E-UTRAN features as IMS (VoLTE), the SRVCC mechanism and the CSFB mechanism (i.e. when in range of RATs that support these enhanced features). Alternatively, in a situation where a UE requests data services provided by the PS domain while in a voice call in the CS domain (e.g. IMS (VoLTE), the SRVCC mechanism and a CSFB mechanism are not currently available), there is no means of analysing connection requirements to determine if enhanced functionalities of E-UTRAN have become available upon movement of the UE.

SUMMARY

According to a first aspect of the present invention, there is provided a method, comprising:

sending an update message to a core network by a user equipment having voice-centric usage and coupled to a legacy access network supporting circuit switched voice service;

receiving an updating accept message containing a status report of possible enhanced network capabilities of a non-legacy access network; and in response to receiving the status report of possible enhanced network capabilities, determining whether to enable the non legacy access network.

According to a second aspect of the present invention, there is provided apparatus comprising a processing system constructed and arranged to cause the apparatus to at least send an update message to a core network by a user equipment having voice-centric usage and coupled to a legacy access network supporting circuit switched voice service; and receiving an updating accept message containing a status report of possible enhanced network capabilities of a non-legacy access network; and in response to receiving the status report of possible enhanced network capabilities, determine whether to enable the non-legacy access network.

According to a third aspect of the present invention, there is provided a computer program comprising instructions executable by a machine for performing operations, said operations comprising:

sending an update message to a core network by a user equipment having voice-centric usage and coupled to a legacy access network supporting circuit switched voice service;

receiving an updating accept message containing a status report of possible enhanced network capabilities of a non-legacy access network; and in response to receiving the status report of possible enhanced network capabilities determining whether to enable the non-legacy access network.

According to a fourth aspect of the present invention, there is provided apparatus, comprising:

means for sending an update message to a core network by a user equipment having voice-centric usage and coupled to a legacy access network supporting circuit switched voice service;

means for receiving an updating accept message containing a status report of possible enhanced network capabilities of a non-legacy access network; and in response to receiving the status report of possible enhanced network capabilities, determining whether to enable the non-legacy access network.

According to a fifth aspect of the present invention, there is provided a method, comprising:

determining a type of service requested of a network;

in response to determining that the type of service is one or more data services, determining whether reactivation of an Evolved Universal Mobile Telecommunications System Terrestrial Radio Access Network based upon the level of service is required for the data service type, and in response to determining that the type of service request is one or more voice services, determining whether reactivation of an Evolved Universal Mobile Telecommunications System Terrestrial Radio Access Network based upon the level of service is required for the voice service type.

According to a sixth aspect of the present invention, there is provided apparatus, comprising:

a processing system constructed and arranged to cause the apparatus to at least;

determine a type of service requested of a network;

in response to determining that the type of service is one or more data services, determining whether reactivation of an Evolved Universal Mobile Telecommunications System Terrestrial Radio Access Network based upon the level of service required for the data service type, and in response to determining that the type of service request is one or voice services, determining whether reactivation of an Evolved Universal Mobile Telecommunications System Terrestrial Radio Access Network based upon the level of service required for the voice service type.

According to a seventh aspect of the present invention, there is provided a computer program comprising instructions executable by a machine for performing operations, said operations comprising:

determining a type of service requested of a network;

in response to determining that the type of service is one or more data services, determining whether reactivation of an Evolved Universal Mobile Telecommunications System Terrestrial Radio Access Network based upon the level of service required for the data service type, and in response to determining that the type of service request is one or more voice services, determining whether reactivation of an Evolved Universal Mobile Telecommunications System Terrestrial Radio Access Network based upon the level of service required for the voice service type.

According to an eighth aspect of the present invention, there is provided apparatus, comprising:

means for:

determining a type of service requested of a network;

in response to determining that the type of service is one or more data services, determining whether reactivation of an Evolved Universal Mobile Telecommunications System Terrestrial Radio Access Network based upon the level of service required for the data service type, and in response to determining that the type of service request is one or more voice services, determining whether reactivation of an Evolved Universal Mobile Telecommunications System Terrestrial Radio Access Network based upon the level of service required for the voice service type.

The processing systems described above may comprise at least one processor and at least one memory which stores a computer program, the at least one memory with the computer program being configured with the at least one processor to cause the apparatus to at least operate as described above.

There may be provided a program storage device readable by a machine, tangibly embodying a program of instructions as described above.

These and other embodiments and aspects are detailed below with particularity.

Further features and advantages of the invention will become apparent from the following description of preferred embodiments of the invention, given by way of example only, which is made with reference to the accompanying drawings.

DETAILED DESCRIPTION

Example embodiments of this invention provide apparatus, methods, and computer programs that enable a voice centric user equipment (UE) which can be temporarily camped on a legacy access network supporting circuit switched (CS) voice services with an Evolved Universal Mobile Telecommunications System (UMTS) Terrestrial Radio Access Network (E-UTRAN), wherein the temporarily camped UE was previously denied CS service access by an Evolved Packet System Mobility Management (EMM) entity due to network configuration or temporary network problems. Other example embodiments of this invention provide apparatus, methods, and computer programs that analyse connection requirements to determine if reactivation with E-UTRAN is required to support data services. As used throughout this specification, the term "enable/disenable E-UTRAN" and "reactivate/deactivate E-UTRAN" refers to the availability/non-availability of one or more of certain enhanced E-UTRAN features such as IMS, CSFB and SRVCC for support voice service whereas those enhanced E-UTRAN features were previously not available.

Figure 1:
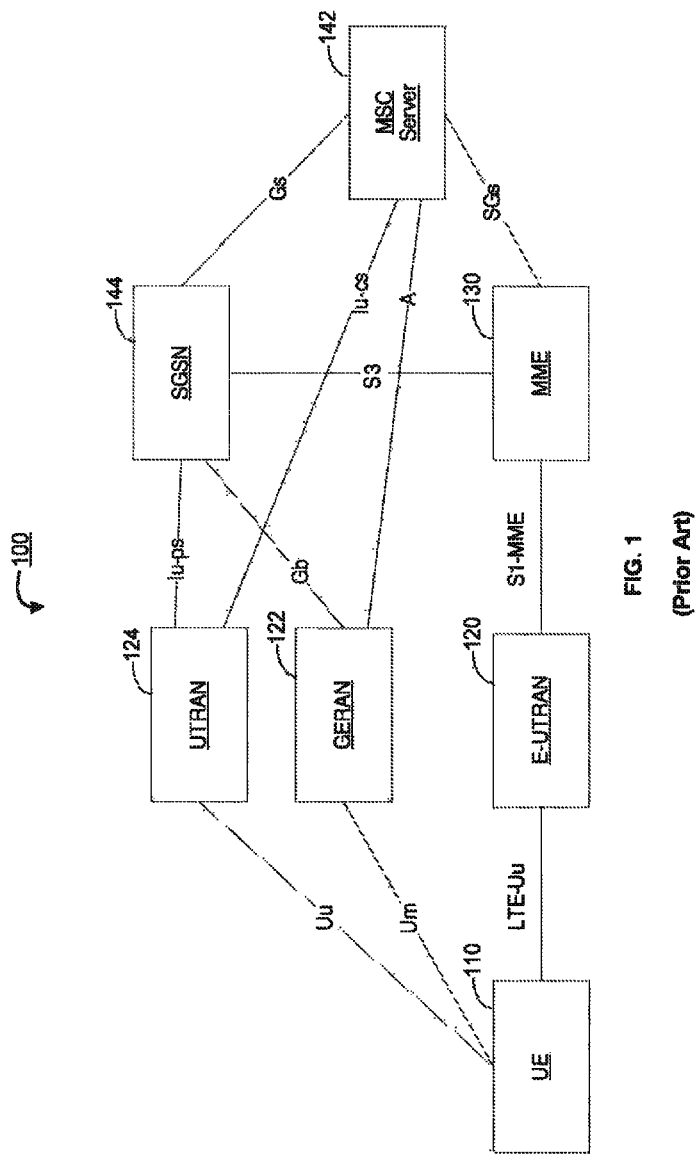
FIG. 1 reproduces FIG. 4.2-1 of 3GPP TS 23.272 and shows the evolved packet core architecture for circuit switch fallback (CSFB) in evolved Universal Mobile Telecommunications System terrestrial (UMTS) radio access network (E-UTRAN)
Figure 2:
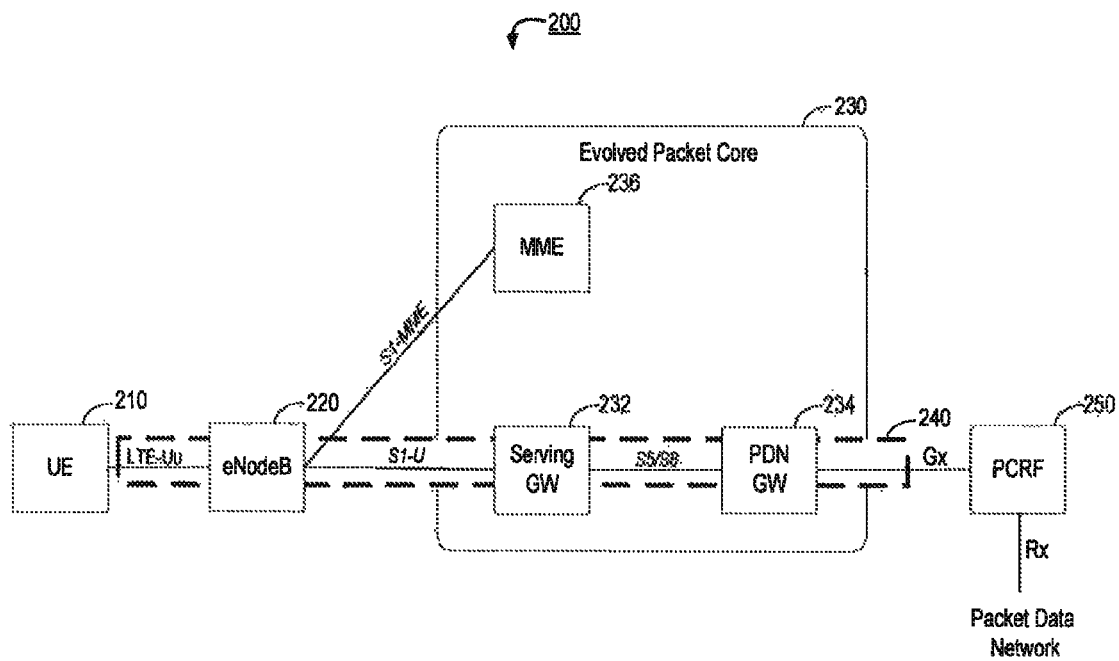
FIG. 2 shows basic evolved packet core (EPC) entities and non-access stratum (NAS) functionalities in accordance with some example embodiments of the invention.

In LTE, the non-access stratum (NAS) is a functional layer (protocol layer) between the evolved packet core (EPC) and the user equipment (UE). NAS procedures are responsible for: selection of a mobile network, attachment to the selected network, and updating the location of the UE. Referring now to FIG. 2, an illustration of some basic EPC entities and NAS functionalities 200 are shown. In FIG. 2, EPC 230 contains two functional elements in the user plane (i.e. the serving gateway (S-GW) 232 and the packet data network gateway (PDN-GW) 224) and one element in the control plane (i.e. the mobility management entity (MME) 236), NAS signalling provides sublayers for EPS mobility management (EMM) and EPS connection management (ECM) between the UE 210 and the MME 236 in the EPS 230. Logical connections in the control plane between UE 210 and MME 236 disregard eNodeB 220 (i.e. RF interface LTE Uu and S1-MME are logically combined).

The MME 236 creates a UE context when UE 210 turns on and attaches to the network by assigning UE 210 a unique temporary identity called the SAE-temporary mobile subscriber identity (S-TMSI). Mobility management and connection management in EPC is described by the EMM and ECM sublayers in terms of numerous states in the UE and the MME. The key states are: EMM-DEREGISTERED/EMM-REGISTERED for EMM and ECM-IDLE ECM-CONNECTED in ECM. For example, UE 210 in the EMM-DEREGISTERED state is not reachable by MME 236. However, the UE context (S-TMSI) can be stored in the UE 210 and MME 236. As such, the UE 210 is in the EMM-DEREGISTERED state in MME 236. If UE 210 is in the EMM-REGISTERED state, its location is known, accuracy of its tracking is assumed and it can have at least one active PDN connection (PND-GW via interface S1-U and S5/S8). When UE 210 is in the ECM-IDLE state, NAS signalling does not occur between the EPS 230 and UE 210. If UE 201 enters both the EMM-REGISTERED and ECM-IDLE state, UE 210 performs the following functions: (i) it sends tracking area update; (ii) it sends periodic tacking area updates (TAU); (iii) it sends service requests, and (iv) it responds to pages MME 236.

In NAS signalling, message dialogues between the UE and network are guarded by timers as specified by 3GPP TS 24.301 in sub clause 10.2 for EPS mobility management and session management. For EPS mobility management, there are 7 timers and there are 14 timers for the UE. Each timer is allocated a timer value, a state, a cause of start, a normal stop and an expiration event.

For example in the UE, the T3410 timer is caused to start when a UE sends an ATTACH REQUEST in the EMM- REGISTRATION-INITIATED state. The duration is 15 seconds (timer value) as calculated by the T3410 timer and it will stop under normal conditions if an ATTACH ACCEPT or ATTACH REJECT is received by the UE. On expiration, the T3411 or T3402 EPS mobility management timer will start in the UE. The T3402 is basically a "timeout" timer which is caused to start after five flailed attempts to register with the EMM during the EMM-REGISTRATION-INITIATED state, or the EMM-TRACKING AREA UPDATE-INITIATED state. That is, either an ATTACH ACCEPT is not received hack by UE from the network, or the TRACKING AREA UPDATE ACCEPT is similarly timed out after five attempts by the UE.

A UE attached to the network can receive EPS services (depending upon the type of services requested) and operates in one of the following modes:
 a) PS mode 1 of operation: the UE registers only to EPS services, and UE's usage setting is "voice centric";
 b) PS mode 2 of operation: the UE registers only to EPS services, and UE's usage setting is "data centric";
 c) CS/PS mode 1 of operation: the UE registers to both EPS and non-EPS services, and UE's usage setting is "voice centric," and
 d) CS/PS mode 2 of operation: the UE registers to both EPS and not services, and UE's usage setting is "data centric."

After registering with the network, the UE is required to signal each change of its location to the network in order to maintain connectivity while moving. This is accomplished by procedures called location updating and routing area updating for the CS and GPRS PS domains. The location of a UE is tracked by describing its location within a cell by means of location areas (LA) and routing areas (RA). To allow for identification of the specific UE location in the cell, identification codes are provided fix LA and RA, location area identification (LAI) and routing area identification (RAI), respectively. The LAI uniquely identifies a location area of the UE in the CS domain and the RAI uniquely identifies the UE in the PS domain.

According to sub clause 9.2.13 of 3GPP TS 24.008 V11.2.1 (2012-3) 3rd Generation Partnership Project; Technical Specification Group Core Network and Terminals; Mobile Radio Interface Layer 3 Specification; Core Network Protocols; Stage 3 (Release 11), an MSC sends a UE a LOCATION UPDATING ACCEPT message which can include several information elements (IEs) to indicate that the location updating procedure, or international mobile subscriber identifier (IMSI) attach procedure, has been completed. The IE can, for example, include a Mobile identity IE (i.e. S-TMSI), an equivalent PLMNS IE, emergency number list IE, a T3212 timer IE, as well as the location updating accept message type IE.

According to sub clause 9.4.15 of 3GPP TS 24.008 V11.2.1 (2012-3) 3rd Generation Partnership Project; Technical Specification Group Core Network and Terminals; Mobile Radio Interface Layer 3 Specification; Core Network Protocols; Stage 3 (Release 11), an SGSN sends a NE a ROUTING AREA UPDATE ACCEPT message to provide the UE with General Packet Radio Service (GPRS) mobility management data in response to a ROUTING AREA UPDATE REQUEST message sent from the UE. The ROUTING AREA UPDATE ACCEPT message can include, for example, several information elements (IEs) which set timing for periodic, RA updates, routing area identification, UE identity, negotiate the READY timer, and provide limited information on network features which are supported.

In certain circumstances, a UE must attempt to select a legacy network access (such as GERAN or UTRAN) and disable the UE's E-UTRAN capabilities. An example could be the lack of circuit switched services in the registered PLMN via E-UTRAN. As such, a voice centric UE would need to camp on a GERAN or UTRAN cell in order to ensure that the most critical services (e.g. voice services in the CS domain) is available for the user. However, the duration of this condition can vary. If the situation is a result of network configuration, it could continue for a very long time.

Some examples of situations in which E-UTRAN might be temporarily unavailable are described in clause 5.5.1.3.4.3 of 3GPP TS 24.301 V11.2.1 (2012-3) 3rd Generation Partnership Project; Technical Specification Group Core Network and Terminals; Non-Access-Stratum (NAS) protocol for evolved packet system (EPS); Stage 3 (Release 11). According to 3GPP TS 24.301 V11.2.1, a voice centric UE may have to disable E-UTRAN connectivity due to various temporary network problems. An example of this is when a UE receives an ATTACH ACCEPT message from the network which includes an evolved packet system mobility management (EMM) information element (IE) having certain cause values. Some specific examples provided in 3GPP TS 24.301 V11.2.1 include cause values #16, #17, #18, and #22. EMM cause value #16 indicates that an ATTACH REQUEST sent by a UE is accepted by the network, but the UE must disable E-UTRAN because the mobile switching centre (MSC) is temporarily not reachable. EMM cause value #17 indicates that an ATTACH REQUEST sent by a UE is accepted by the network, but the UE must disable E-UTRAN because of a network failure. EMM cause value #18 indicates that an ATTACH REQUEST sent by a UE is accepted by the network, but the UE must disable E-UTRAN because the CS domain is not available. EMM cause value #18 further describes adjusting EMM timers under PS mode 1 and 2 scenarios. EMM cause value #22 indicates that an ATTACH REQUEST sent by a UE is accepted by the network, but the UE must disable E-UTRAN because of congestion in the network (e.g. lack of processing resources). EMM cause value #22 further describes adjusting EMM timers under PS mode 1 and 2 scenarios.

3GPP TS 23.203 V11.5.0 (2012-03) 3rd Generation Partnership Project; Technical Specification Group Services and System Aspects; Policy and Charging Control Architecture (Release 11) defines the concept of quality of service (QoS) class identifier in LTE, and standardises associated bitrates that specify the QoS information for service data flows (SDFs) and bearer on the Gx and Gxx reference points (i.e. between the packet data network gateway (PDN-GW) and a UE) which can be deployed crossing multiple interfaces. For example, referring to FIG. 2, an EPS bearer 240 from UE 210 crosses a LTE-Uu RF interface, the S1-U interface (between the eNodeB 220 and S-GW 232), and the S5/S8 interface (between S-GW 830 and PDN-GW 234) to the Gx reference point designated before the policy and charging rules function (PCRF) 250.

The QoS parameters are: QCI, allocation and retention policy (ARP), guarantee bit rate (GBR), and maximum bit rate (MBR). An eNodeB in the access network ensures that the necessary QoS for a bearer over a radio interface (e.g. LTE Uu RF interface) is met. Set forth below in Table 1.1 is a reproduction of Table 6.1.7 from 3GPP TS 23.203 which shows standardised QoS Class Identifiers (QCIs) for LTE.

TABLE 1.1

Standardised QCI characteristics for LTE

| QCI | Resource Type | Priority | Packet Delay Budget (ms) | Packet Error Loss Rate | Example Services |
|---|---|---|---|---|---|
| 1 | GBR | 2 | 100 | $10^{-2}$ | Conversational Voice |
| 2 |  | 4 | 150 | $10^{-3}$ | Conversational Video (Live Streaming) |
| 3 |  | 3 | 50 | $10^{-3}$ | Real Time Gaming |
| 4 |  | 5 | 300 | $10^{-6}$ | Non-Conversational Video (Buffered Streaming) |
| 5 | Non- | 1 | 100 | $10^{-6}$ | IMS Signalling |
| 6 | GBR | 6 | 300 | $10^{-6}$ | Video (Buffered Streaming) TCP-based (e.g. www, e-mail, chat, ftp, p2p file sharing, progressive video, etc.) |
| 7 |  | 7 | 100 | $10^{-3}$ | Voice, Video (Live Streaming) Interactive Gaming |
| 8 |  | 8 | 300 | $10^{-6}$ | Video (Buffered Streaming) |
| 9 |  | 9 |  |  | TCP-based (e.g. www, e-mail, chat, ftp, p2p file sharing, progressive video, etc.) |

As shown in Table 1.1, each of the nine QCIs is characterised by its priority, packet delay budget, and acceptable packet loss (i.e. packet error loss rate (PELR)). Every QCI (whether GBR or Non-GBR) is associated with a priority level in which priority level 1 is the highest priority level. The priority levels are used to differentiate between service data flow (SDF) aggregates of the same UE, and also are used to differentiate between SDF aggregates from different UEs. The PDB defines an upper bound for the time that a packet may be delayed between the UE and the policy control enforcement function (PCEF). The PCEF is located inside the PDN-GW and applies received information (e.g. QCIs) to cause the establishment of a dedicated bearer for handling various PS services, such as those listed in Table 1.1 under the heading "Example Services" and an example shown in FIG. 2 (i.e. FPS bearer 240) The PELR defines an upper bound for the rate of service data units (SDUs) (e.g. IP packets) that have been processed by the sender of a link layer protocol (e.g. the radio link control (RLC) in E-UTRAN), but that are not successfully delivered by the corresponding receiver to the upper layer (e.g. packet data convergence protocol (PDCP) in E-UTRAN).

Figure 3:
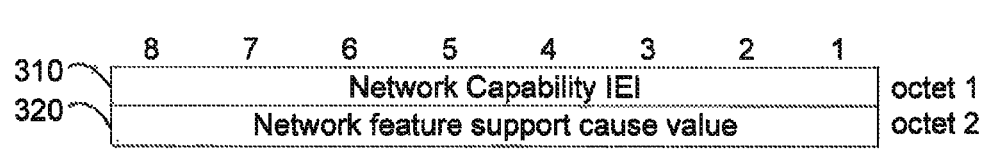
FIG. 3 shows a network capability information element identifier (NC IEI) in accordance with some example embodiments of the present invention.

Referring now to FIGS. 3 thorough 7, example embodiments of this invention provide apparatus, methods, and computer programs that reactivate a voice centric user equipment (UE) temporarily camped on a legacy access network supporting circuit switched (CS) voice services with an evolved Universal Mobile Telecommunications System (UMTS) terrestrial radio access network (E-UTRAN), wherein the temporarily camped UE was previously denied network access by an evolved packet system mobility management (EMM) entity due to temporary network problems. Other example embodiments of this invention described below provide apparatus, methods, and computer programs that analyse connection requirements to determine if reactivation with E-UTRAN is required to support data services.

In one example embodiment of the present invention, a new information element identifier (NC IEI) is included in a LOCATION UPDATING ACCEPT message sent from the network to a UE. In an alternative example embodiment of the present invention, a new information element identifier (NC IEI) is included in a LOCATION UPDATING ACCEPT message sent from the network to a UE.

Referring now to FIG. 3, a network capability information element identifier (NC IEI) 300 is shown in accordance with an example embodiment of the present invention. As shown in FIG. 3, an NC IEI 300 is a type 3 information element, which is defined as having a fixed length and at least one octet of content. Alternatively, NC IEI 300 can be a Type 1 IEI (½ octet or content), a Type 2 IEI (zero octets of content), or a Type 4 IEI (variable length). The first octet 310 defines the IE which contains the signalling information which in this case is a network capability information element in E-UTRAN which is assigned (by a network operator) a one byte unique binary number. The first octet 310 indicates the network capabilities of E-UTRAN, to which the UE is attached. The second octet 320 provides an indication of the type of network capability supported, which the UE receives in a LOCATION UPDATING ACCEPT message or ROUTING AREA UPDATE ACCEPT message in accordance with example embodiments of the present invention. Referring now to Table 1.2, non-limiting sample coding is shown for the second octet 320 of network capability IEI.

TABLE 1.2

Network Capability Value of NC IE1
Network Capability Value (octet 2)

| Bits | | | | | | | | |
|---|---|---|---|---|---|---|---|---|
| 8 | 7 | 6 | 5 | 4 | 3 | 2 | 1 | |
| 0 | 0 | 0 | 0 | 0 | 0 | 1 | 0 | 1 × CS fallback not available |
| 0 | 0 | 0 | 0 | 0 | 0 | 1 | 1 | 1 × CS fallback available |
| 0 | 0 | 0 | 0 | 0 | 1 | 0 | 1 | UTRAN CS fallback not available |
| 0 | 0 | 0 | 0 | 0 | 1 | 1 | 0 | UTRAN CS fallback available |
| 0 | 0 | 0 | 0 | 0 | 1 | 1 | 1 | GERAN CS fallback not available |
| 0 | 0 | 0 | 0 | 1 | 0 | 0 | 0 | GERAN CS fallback available |
| 0 | 0 | 0 | 0 | 1 | 0 | 0 | 1 | IMS voice service not available |
| 0 | 0 | 0 | 0 | 1 | 0 | 1 | 0 | IMS voice service available |
| 0 | 0 | 0 | 0 | 1 | 0 | 1 | 1 | SRVCC not available |
| 0 | 0 | 0 | 0 | 1 | 1 | 0 | 0 | SRVCC available |
| 0 | 0 | 0 | 0 | 1 | 1 | 0 | 1 | VoLTE via generic access not available |
| 0 | 0 | 0 | 0 | 1 | 1 | 1 | 0 | VoLTE via generic access available |
| 0 | 0 | 0 | 0 | 1 | 1 | 1 | 1 | SMS CS fallback not available |
| 0 | 0 | 0 | 1 | 0 | 0 | 0 | 0 | SMS CS fallback available |

In one example embodiment, the NC IEI can be included during an IMSI attach or during a location updating procedure while a UE is attached to a legacy access network in the CS domain with GPRS allowed. Alternatively, the NC IEI can be included with the RA updating (PS domain) or combined RA updating (PS and CS domain) procedures. In either example embodiment, the network can provide network capability information to the UE with either command signal (i.e. LOCATION UPDATING ACCEPT or ROUTING AREA UPDATE ACCEPT) where the UE changes its geographic location within a cell. Alternatively, the UE can receive network capability information in the event that it does not change its locations in the cell. Some non-limiting examples of this are informing the UE of a change in network services, such as a message that the MSC is no longer non-reachable (i.e. up and running) or the network server is no longer temporarily out of service, or that congestion has cleared in the network and the like.

For example, in one scenario, a UE can receive an NC IEI 300 in which octet 2 (Network Capability Value) 320 is encoded with NC value #3 (000000101b). As shown in Table 1.2, this would inform the UE that IMS is now available (if IMS-capable) and, in turn, the UE can reactivate E-UTRAN to take advantage of this enhanced service. As a result of this action, the UE would switch from the CS domain to the PS domain. In such a situation, the UE would no longer employ a legacy access network connection (e.g. Uu or Um RF interface). Alternatively, in another scenario, the UE can receive a NC IEI 300 from the network in which octet 2 (Network Capability Value) 320 is encoded with NC value #4 (000001110b). As shown in Table 1.2, this would inform the UE that UTRAN CS fallback is now available. Then, if the UE is attached to the network only via GERAN, the UE can reactivate E-UTRAN to take advantage of this enhanced service (CSFB). As a result of this action, the UE would still be in a combined CS domain and PS domain. As such, the UE would no longer employ a 2G legacy access network connection (i.e. Um RF interface), and would instead be connected via a 3G legacy network connection (i.e. Uu RF interface). As a result of receiving information contained in the NC IEI 300, the UE would experience enhanced performance over the prior legacy connection method.

Figure 4:
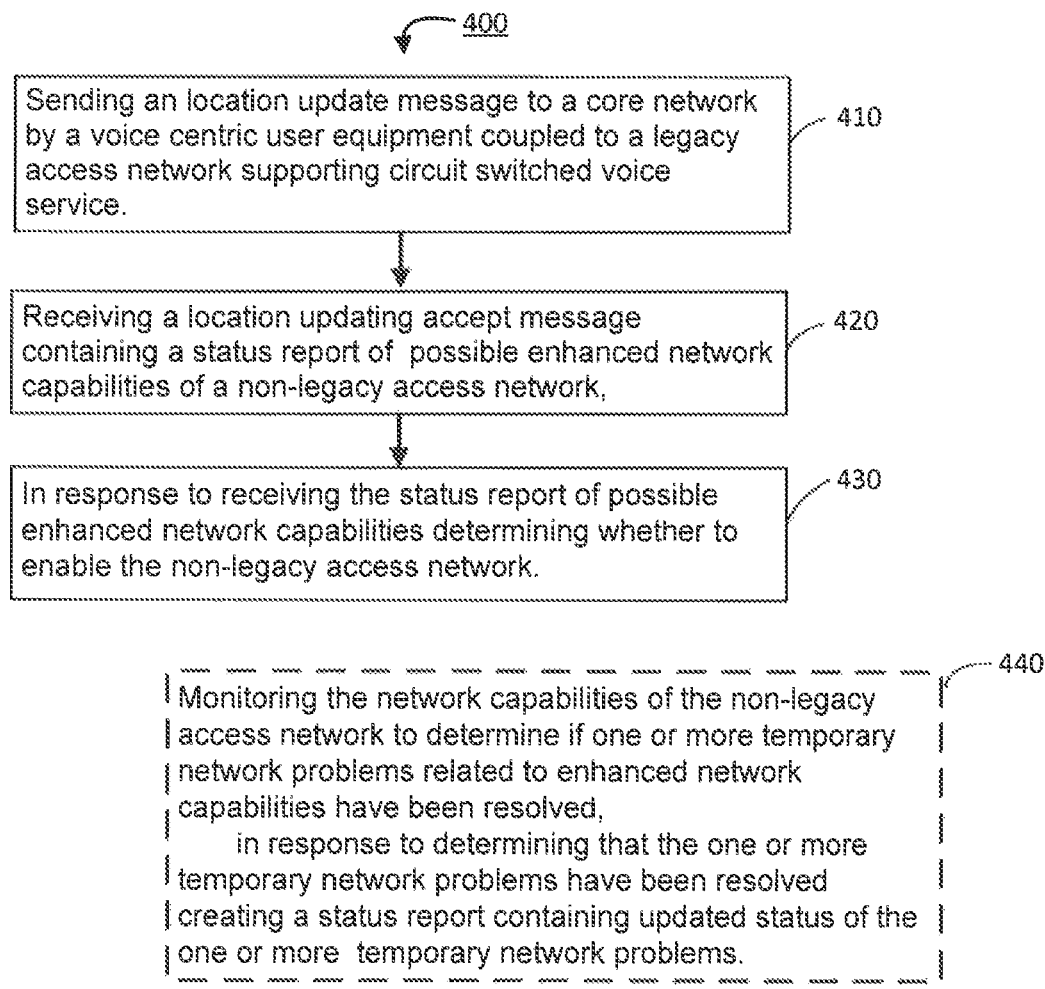
FIG. 4 shows a logical flow diagram that illustrates the operation of a method, and result of execution of computer program instructions embodied on a non-transitory computer readable memory which demonstrates including an status report of possible enhanced network capabilities with a LOCATION UPDATING ACCEPT message in accordance with one example embodiment of the present invention.

Referring now to FIG. 4, there is shown a logical flow diagram that illustrates the operation of a method, and a result of execution of computer program instructions embodied on a non-transitory computer readable memory 400, which demonstrates including a status report of possible enhanced network capabilities of a non-legacy access network with a LOCATION UPDATING ACCEPT message in accordance with one example embodiment of the present invention. As shown in FIG. 4, a voice centric UE coupled to a legacy access network supporting circuit switched voice service sends a LOCATION UPDATING REQUEST message to a core network 410. Prior to sending that location updating request message, the UE became "attached" to a legacy network by EPS signalling procedures known in the art. For example, the UE can initiate either an attach procedure or combined attach procedure as described in clause 5.5.1.2 of 3GPP TS 24.301 (as well as examples illustrated in FIG. 5.5.1.2.2.1 of 3GPP TS 24.301). In other words, the UE is either coupled on a GERAN or UTRAN (e.g. 2G/3G access network via a Um RF interface with a NodeB or Uu RF interface with a Base transceiver station (BTS), respectively) and not with for example E-UTRAN (i.e. 4G access network via eNodeB over LTE-Uu RF interface). Also, as a consequence of being attached to the legacy access networks, the LOCATION UPDATING REQUEST message procedure is handled by way of the mobile switching centre (MSC).

After receiving the LOCATION UPDATING REQUEST, the legacy network sends the UE a LOCATION UPDATING ACCEPT message containing a status report of possible enhanced network capability information of a non-legacy access network 420. In other words, GERAN or UTRAN can provide information to the UE that the E-UTRAN of the same PLMN has become available for CS service. This is applicable for example in the case where the UE is merely temporarily camped on the legacy access network and previously disabled its E-UTRAN capability due to various network problems as described above (e.g. MSC temporarily unavailable, network failure, CS domain not available or congestion). A network capability monitoring function can be employed to periodically poll devices such as the MSC, SGSN, as well as monitor congestion on the network to update the above described NC IE. Accordingly, this example embodiment could include an optional step of monitoring the network capabilities of the non-legacy access network to determine if one or more temporary network problems related to enhanced network capabilities have been resolved, and, in response to determining that the one or more temporary network problems have been resolved, creating a status report containing updated status of the one or more temporary network problems 440.

The UE, in response to receiving the status report of possible enhanced network capabilities, can determine whether to enable the non-legacy access network 420. For example, the UE might re-enable E-UTRAN which it might have previously disabled due to a temporary network problem.

In one example, embodiment as show in Table 1.2, above, the status report can be a network capability information element 300 as shown in FIG. 3. Table 1.2 provides non-limiting examples of possible information reported to a UE. Other information could be provided, such as MSC now available, network up and running, CS domain now available and/or network congestion cleared and the like.

Figure 5:
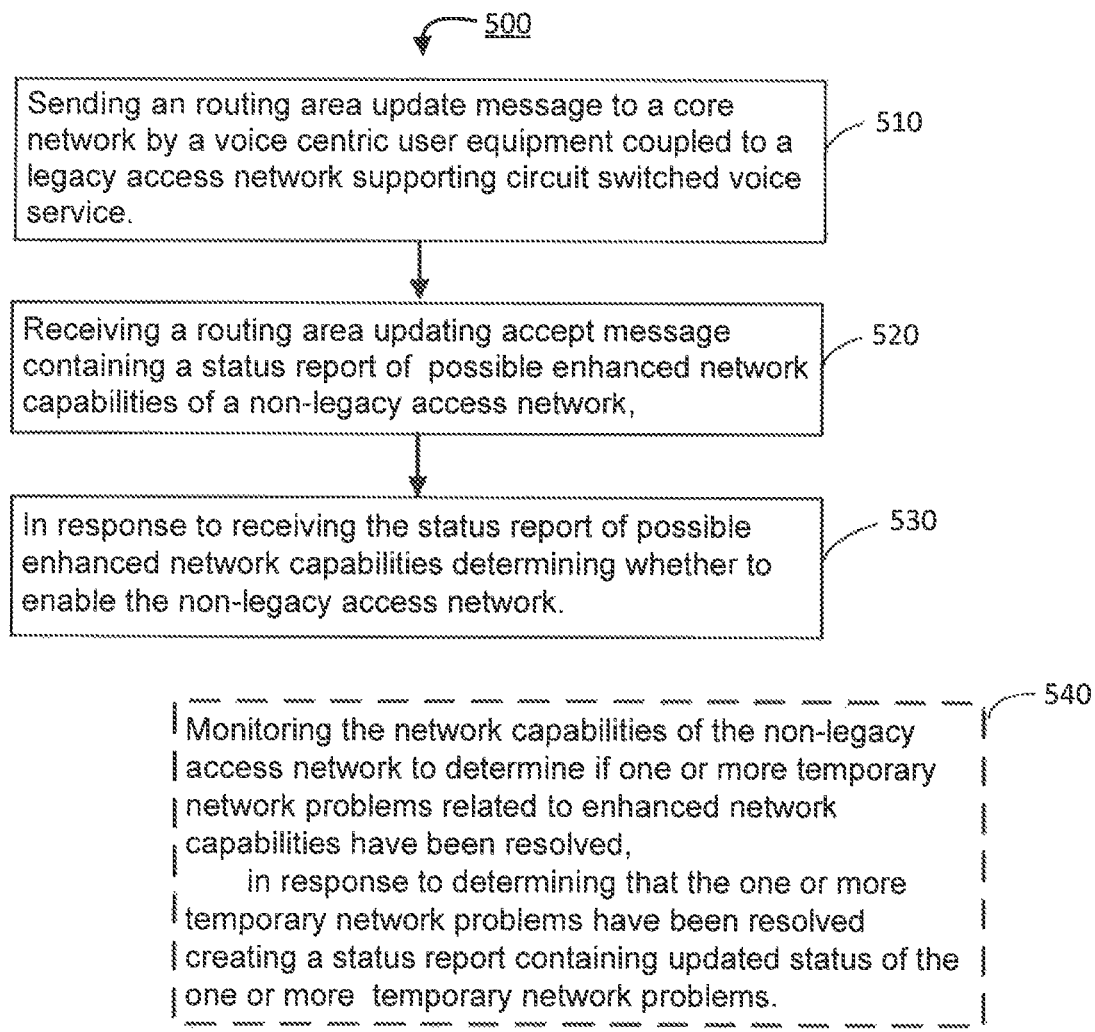
FIG. 5 shows a logical flow diagram that illustrates the operation of a method, and result of execution of computer program instructions embodied on a non-transitory computer readable memory which demonstrates including an status report of possible enhanced network capabilities with a ROUTING AREA UPDATING ACCEPT message in accordance with an alternative example embodiment of the present invention.

Referring now to FIG. 5, there is shown logical flow diagram that illustrates the operation of a method, and a result of execution of computer program instructions embodied on a non-transitory computer readable memory, including a status report of possible enhanced network capabilities of a non-legacy access network with a ROUTING AREA UPDATING ACCEPT message 500 in accordance with an alternative example embodiment of the present invention. As shown in FIG. 5, a voice centric UE coupled to a legacy access network supporting circuit switched voice service sends a ROUTING AREA UPDATING REQUEST message to a core network 510. Prior to sending that location updating request message, the UE became "attached" to a legacy network by EPS signalling procedures known in the art. For example, the UE can initiate either an attach procedure or combined attach procedure as described in clause 5.5.1.2 of 3GPP TS 24.301 (as well as examples illustrated ire FIG. 5.5.1.2.2.1 of 3GPP TS 24.301). In other words, the UE is either coupled on a GERAN or UTRAN (e.g. 2G/3G access network via a Um RF interface with a NodeB or Uu RF interface with a Base transceiver station (BTS), respectively) and not with for example E-UTRAN (i.e. 4G access network via eNodeB over LTE-Uu RF interface). Also, as a consequence of being attached to the legacy access networks, the ROUTING AREA UPDATING REQUEST message procedure is handled by way of the Serving GPRS support node (SGSN).

After receiving the ROUTING AREA UPDATING REQUEST, the legacy network sends the UE a ROUTING AREA UPDATING ACCEPT message containing a status report of possible enhanced network capability information of a non-legacy access network 520. In other words, GERAN or UTRAN can provide information to the UE that the E-UTRAN of the same PLMN has become available for CS service. This is applicable for example in the case where the UE is merely temporarily camped on the legacy access network and previously disabled its UTRAN capability due to various network problems as described above (e.g. MSC temporarily unavailable, network failure, CS domain not available or congestion). A network capability monitoring function can be employed to periodically poll devices such as the MSC, SGSN, as well as monitor congestion on the network to update the above described NC IE. Accordingly, this example embodiment could include an optional step of monitoring the network capabilities of the non-legacy access network to determine if one or more temporary network problems related to enhanced network capabilities have been resolved, and, in response to determining that the one or more temporary network problems have been resolved, creating a status repot containing updated status of the one or more temporary network problems 540.

The UE, in response to receiving the status report of possible enhanced network capabilities, can determine whether to enable the non-legacy access network 530. For example, the UE might re-enable E-UTRAN which it might have previously disabled due to a temporary network problem.

In one example, embodiment as show in Table 1.2, above, the status report can be a network capability information element 300 as shown in FIG. 3. Table 1.2 provides non-limiting examples of possible information reported to a UE. Other information could be provided, such as MSC now available, network up and running, CS domain now available and/or network congestion cleared and the like).

Figure 6:
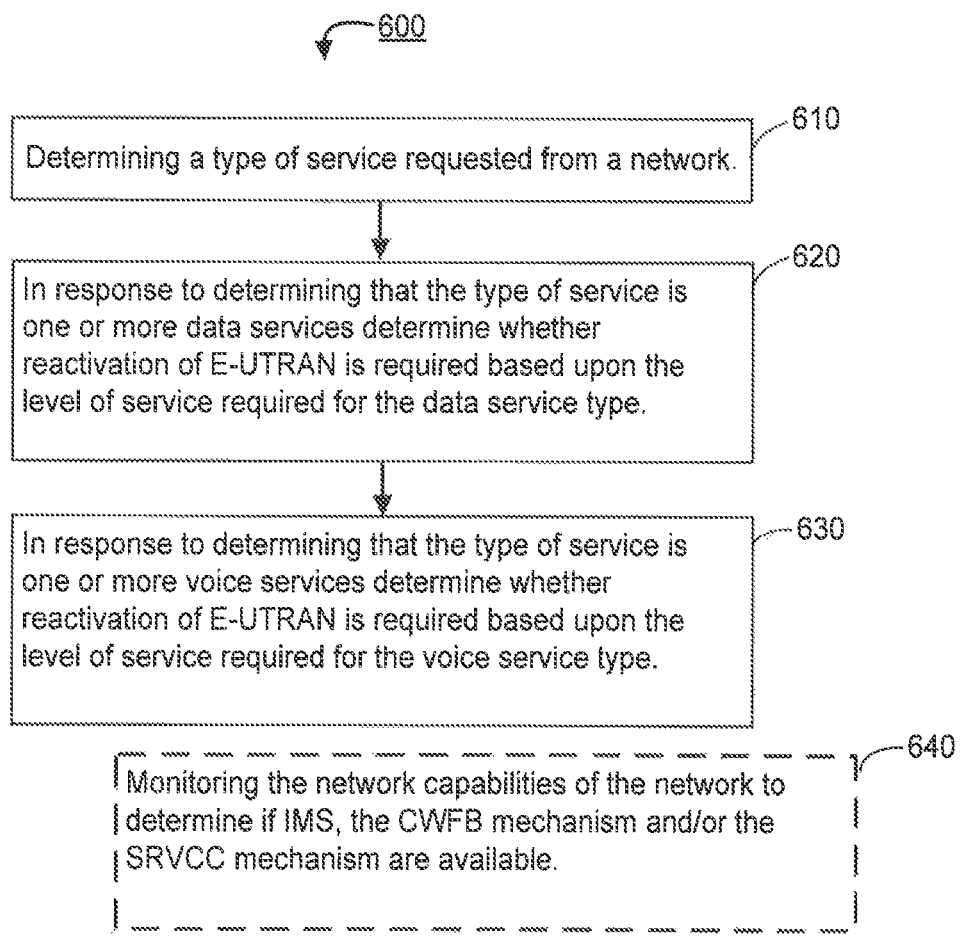
FIG. 6 shows a logic flow diagram that illustrates the operation of a method, and a result of execution of computer program instructions embodied on a computer readable memory in a user equipment, in accordance with some example embodiments of this invention.

Referring now to FIG. 6, which illustrates one example embodiment, QoS parameters could be employed to determine if at least one or more data services requires reactivation of E-UTRAN while a UE is connected to a CS domain by way of a legacy access network. In one example embodiment, the data service request can be a new data service request in another example embodiment, the data service request can be a previously presented yet unsatisfied data service request. In this particular embodiment, a timer implemented in the UE would periodically examine existing data service requests to determine if the current legacy access network can satisfy the data service request. The timer can be for example one of the fourteen existing EPS mobility management timers or a new timer implemented by a network operator or by a user of the UE. For example, the timer can as a non-limiting example be set to check existing data service requests while in the CS domain every 60 seconds, 90 seconds or longer. Alternatively a network operator or a user of the UE can set the timer with time increments for checking existing data services to shorter periods of time than 60 seconds or a time period between 61-89 seconds. The timer implemented in the UE would also serve the function of preventing constant checking of IP packets in this example embodiment to avoid excessive battery power usage.

In one non-limiting example, the QoS of a data request made by a UE would be analysed based the service requested, according to its QCI number as disclosed above in Table 1.1. For example, a data request requiring IMS signalling would involve a QCI number 1 and, as such, would require reactivation of E-UTRAN. On the other hand, if a data request required conversational voice, E-UTRAN would not be reactivated and the UE would maintain its connection to the CS domain. This is but one non-limiting example of using QCI numbers; other possible configurations are possible. In addition, QCI parameters such as priority, PDB, and PELR also can be used as determining factors for reactivation of E-UTRAN. In another non-limiting example, ARP can be employed as determining metric for reactivation of E-UTRAN. Yet another non-limiting embodiment can employ GBR and/or as determining factors for reactivation of E-UTRAN.

In an alternative example embodiment, IP packet analysis can be employed to determine if a data service request requires reactivation of E-UTRAN while a UE is the connected to a CS domain by way of a legacy access network. One possible non limiting example could obtain IP information regarding data packets by examining a UE data service request (i.e. destination IP address (e.g. IP versions 4 or 6) and/or port address) in the policy and charging rules function (PCRF) located in the PDN-GW (i.e. employing the AAR command). In another embodiment, an IP filter can be deployed in the UE, or separately provided in the PDN-GW, to provide functionality of obtaining IP information regarding data packets by examining a UE data service request destination IP address (i.e. IP versions 4 or 6) and/or port address).

FIG. 6 illustrates example embodiments of this invention which provide methods and computer programs embodied on a non-transitory computer readable memory for determining if a data service request by a UE requires reactivation of E-UTRAN while a UE is the connected to a CS domain by way of a legacy access network. As shown in FIG. 6, the method or computer program instructions would first determine what type of service is requested of a network 610. In response to determining that the type of service is one or more data services, it is determined whether reactivation of E-UTRAN is required based upon the level of service required for the data service type 620. In response to determining that the type of service request is one or more voice services, it is determined whether reactivation of E-UTRAN is required based upon the level of service required for the voice service type 630.

In one non-limiting example, the level of service is determined by analysing the QoS of a data or voice request made by a UE. For example, the network can analyse the data or service request based upon the level of service for specific data or voice types as described by its unique QCI number as disclosed above in Table 1.1. For example, a data request type requiring IMS signalling would require QCI number 1 and, as such, would require reactivation of E-UTRAN. On the other hand, if a data request required conversational voice, E-UTRAN might not need to be reactivated and the UE could maintain its connection to the CS domain. This is but one non-limiting example of using QCI numbers; other possible configurations are possible. For example, QCI parameters such as priority, PDB, and PELR also can be used as determining the level of service for reactivation of E-UTRAN. In another non-limiting example, ARP can be employed as a determining metric for reactivation of E-UTRAN. Yet another non-limiting embodiment can employ GBR and/or MBR as a determining metric for reactivation of E-UTRAN.

In another alternative example embodiment, IP packet analysis can be employed to determine if a data service request requires reactivation of E-UTRAN while a UE is connected to a CS domain by way of a legacy access network. One possible non-limiting example could obtain IP information regarding data packets by examining a UE data service request such as destination IP address (e.g. IP versions 4 or 6) and/or port address) in the policy and charging rules function (PCRF) located in the PDN-GW (i.e. employing the AAR command). In another embodiment, an IP filter can be deployed in the UE, or separately provided in the PDN-GW, to provide functionality of obtaining IP information regarding data packets by examining a UE data service request destination IP address (i.e. IP versions 4 or 6) and/or port address).

An additional optional step included in the above example embodiments employing QCI, QoS parameters or IP analysis could involve monitoring the network capabilities of the network to determine if IMS, the CWFB mechanism and/or the SRVCC mechanism are available 640.

Figure 7:
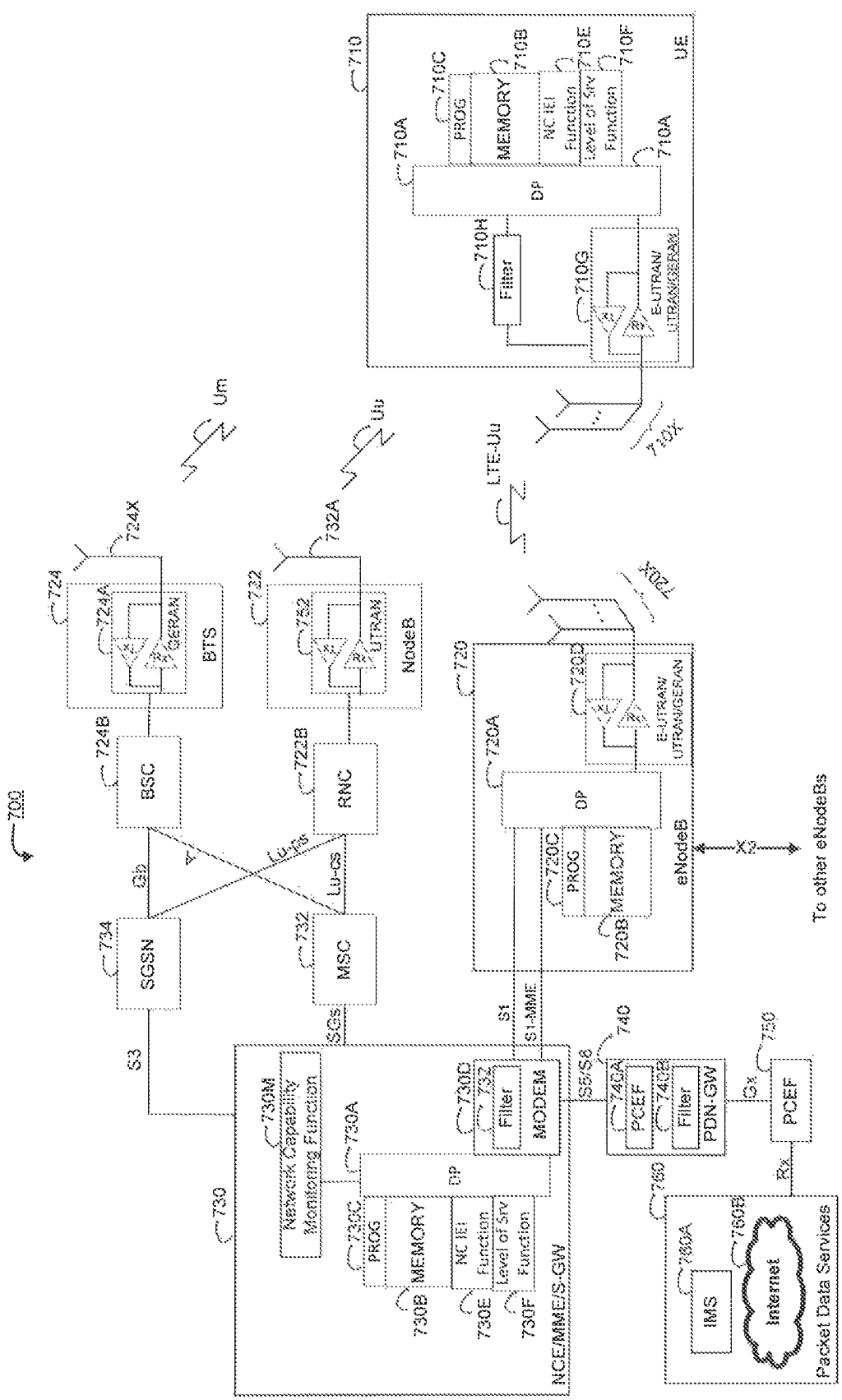
FIG. 7 shows a simplified block diagram of various network devices and user equipment (UE), which are example electronic devices suitable for use in practising some example embodiments of the invention.

Reference is now made to FIG. 7 which shows a simplified block diagram of examples of various electronic devices and apparatus that are suitable for use in practising some example embodiments of this invention. In FIG. 7, a first access node 720 is adapted for communication over a wireless link LTE-Uu with a mobile apparatus, such as a mobile terminal or UE 710. The UE 710 may be a mobile phone, smart phone, laptop computer or tablet computer and the like. The first access node 720 may be a macro eNodeB, a WLAN AP, a femtoeNodeB, or other type of base station (BS) or access point (AP) suitable for supporting E-UTRAN.

For completeness, the UE 720 includes a processor, such as at least one data processor (DP) 710A, a memory, such as at least one computer-readable memory (MEMORY) 710B storing at least one computer program (PROG) 710C, and also a radio access technology communication module 710 capable of transmitting in E-UTRAN/UTRAN and GERAN as non-limiting examples of UMTS supported. Radio access technology communication module 710 also can have an antenna 710X. It should be noted that some devices are so small or have a form factor which precludes an antenna. Radio access technology communication module 710 includes a LTE/LTE-A transceiver 710G for wirelessly communicating with the first access node 720 via one or more antennas 710X. Long Term Evolution/Long Term Evolution Advanced (LTE/LTE-A) transceiver 710G can be any transceiver; such non-limiting examples include any other transceiver capable of communicating with a Universal Mobile Telecommunications System, an Evolved Universal Mobile Telecommunications Terrestrial Radio Access Network (E-UTRAN), a Global System for Mobile communications (GSM), a Universal Terrestrial Radio System (UTRA) Access network or cellular networks employing Wideband Code Division Multiple Access (WCDMA) or High Speed Packet Access (HSPA).

UE 710 includes at least one of the PROGs 710C to allow the UE to determine the network capacity from an NC IEI received in either a LOCATION UPDATING ACCEPT message or ROUTING AREA UPDATING ACCEPT message configured for employing the NC IEI function 710E in accordance with the above described methods and computer program instructions in accordance with one or more embodiments of the present invention. Also, the UE 710 includes a level service function 710F configured for determining a service type of a service request (e.g. data or voice service) in accordance with one or more of the above embodiments of the present invention. The UE 710 is also configured for receiving NAS signalling the network core element/mobility management entity/serving gateway (NCE/MME/S-GW) 730 as described above in accordance with example embodiments of the present invention.

The first access node 720 similarly includes a processor, such as at least one data processor (DP) 720A and a storing device, such as at least one computer-readable memory (MEMORY) 720B which stores at least one computer program (PROG) 720C. The first access node 720 also includes communicating means such as a Long Term Evolution/Long Term Evolution Advanced (LTE/LTE-A) transceiver 720D which includes a transmitter TX and a receiver RX for bidirectional wireless communications with the UE 710 via one or more antennas 720X. The LTE/LTE-A transceiver 720D can be any other transceiver cable of communicating with a Universal Mobile Telecommunications System, an Evolved Universal Mobile Telecommunications Terrestrial Radio Access Network (E-UTRAN), a Global System for Mobile communications (GSM), a Universal Terrestrial Radio Access network (UTRAN), or cellular networks employing Wideband Code Division Multiple Access (WCDMA) or High Speed Packet Access (HSPA). First access node 720 also includes at least one of the PROGs 720C to carry out the above described methods and computer program operations in accordance with one or more embodiments of the present invention. Also as shown in FIG. 7 are data interfaces S1 and control interface S1-MEE which are coupled to the first access node 720 with network core element/mobility management entity/service gateway NCE/MME/S-GW 730.

NCE/MME/S-GW 730 includes a processor (such as at least one data processor (DP) 730A, a storing device, such as at least one computer-readable memory (MEMORY) 730B which stores at least one computer program (PROG) 730C, and a communicating device such as a modem 730D for bidirectional communication with the first access node 720 via the link S1 and S1-MME and which communicates with legacy access networks (such as UTRAN via interface Lu-ps and radio network controller (RNC) 722C and GERAN via interface A and base station controller (BSC) 724B). Serving (GPRS) support node (SGSN) 734 is also shown coupled to NCE/MME/S-GW 730 by way of the S3 interface and coupled to BSC 724B and RNC 722B by way of Gb and Lu-ps interfaces, respectively. The mobile switching centre 732 is coupled to NCE/MME/S-GW 730 by way of SGs interface and coupled to the SGSN by way of the S3 interface. Also, MSC 732 is coupled to RNC 722B and BSC 724B by way of Lu-cs and A interfaces, respectively.

NCE/MME/S-GW 730 can be coupled to a packet data network gateway (PDN-GW) 740 via interfaces S5/S8. As shown in NCE/MME/S-GW 730, a NC IEI Function 730E is configured for carrying out one or more of the above example embodiments of the present invention. NCE/MME/S-GW 730 also includes a level of service function 730F configured for carrying out one or more of the above example embodiments of the present invention.

PDN-GW 740 includes a PCEF 740A, as described above, in furtherance of the above described example embodiments of the present invention. Also, PDN-GW 740 includes an IP Biter 740B for determining the level of service required for data services. PDN-GW 740 is coupled to PCEF 740 via logical reference point Gx. Alternatively, UE 710 can be configured to include an IP filter 710H to provide similar functionality. As shown in FIG. 7, PCEF 740 is coupled to packet data services 760. Packet data services 760 include IMS 760A and the Internet as non-limiting examples of such services.

While not particularly illustrated in FIG. 7, but as well known in the art, UE 710 and NCE/MME/S-GW 730 can further be configured with additional enhancements such as a CSFB mechanism and a SRVCC mechanism. NCE/MME/S-GW 730 includes a network capability monitoring function 730M for determining the availability of the above additional E-UTRAN enhancements (i.e. CSFB and SRVCC) as well as the availability of IMS in accordance with example embodiments of the present invention. NCE/MME/S-GW 730 also includes local memory 740B which is a database (e.g. subscriber information). Base transceiver station (BTS) 724 and NodeB 722 are examples of legacy access networks available to UE 710 via RF interfaces Um and RF interfaces Uu in accordance with known CSFB and SRVCC methods.

In these regards, the example embodiments of this invention may be implemented at least in part by computer software stored on the MEM 710B, 720B and 730B which is executable by the DP 710A, DP 720A and/or by the DP 720A of the access node 720 or NCE/MME/S-GW 730 and/or UE 710, or by hardware, or by a combination of tangibly stored software and hardware (and tangibly stored firmware). Electronic devices implementing these aspects of the invention need not be the entire devices as depicted at FIG. 7, but example embodiments may be implemented by one or more components of same, such as the above-described tangibly stored software, hardware, firmware and DP, or a system-on-a-chip SOC or an application specific integrated circuit ASIC.

Various embodiments of the computer readable MEMs 710B, 720B, 730B include any data storage technology type which is suitable to the local technical environment, including, but not limited to, semiconductor based memory devices, magnetic memory devices and systems, optical memory devices and systems, fixed memory, removable memory, disc memory, flash memory, DRAM, SRAM, EEPROM and the like. Various embodiments of the DPs 710A, 720A and 730A include, but are not limited to, general purpose computers, special purpose computers, microprocessors, digital signal processors (DSPs) and multi-core processors.

As used in this specification, the term "circuitry" refers to all of the following: (a) hardware-only circuit implementations (such as implementations in only analog and/or digital circuitry) and (b) combinations of circuits and software and/or firmware), such as (as applicable): (i) to a combination of processor(s) or (ii) to portions of processor(s)/software (including digital signal processor(s)), software, and memory (ies) that work together to cause an apparatus, such as a mobile phone or server, to perform various functions) and (c) circuits, such as a microprocessor(s) or a portion of a microprocessor(s), that require software or firmware for operation, even if the software or firmware is not physically present. This definition of "circuitry" applies to all uses of the term in this specification, including in any claims. As a further example, as used in this specification, the term "circuitry" would also cover an implementation of merely a processor (or multiple processors) or portion of a processor and its (or their) accompanying software and/or firmware. The term "circuitry" would also cover, if applicable to the particular claim element, a baseband integrated circuit or applications processor integrated circuit for a mobile phone or a similar integrated circuit in server, a cellular network device, or other network device.

Further, some of the various features of the above non-limiting embodiments may be used to advantage without the corresponding use of other described features. The foregoing description should therefore be considered as merely illustrative of the principles, teachings and example embodiments of this invention, and not in limitation thereof.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method, comprising:
   sending an update message to a core network by a voice centric user equipment coupled to a legacy access network supporting circuit switched voice service; and
   receiving an updating accept message containing a status report of possible enhanced network capabilities of a non-legacy access network, the status report comprising a network capability information element identifying an availability of a circuit switch fallback mechanisms, an availability of a single radio call continuity mechanisms, an availability of an Internet protocol multimedia subsystem, and an availability of a voice over long term evolution via generic access mechanism;
   in response to receiving the status report of possible enhanced network capabilities determining whether to enable the non-legacy access network.

2. The method of claim 1, wherein the legacy access network is a global system for mobile communication/enhanced data rates for global evolution access network or universal mobile telecommunications system terrestrial radio access network and the non-legacy access network is a evolved universal mobile telecommunications system terrestrial access network.

3. The method of claim 2, wherein the voice centric user equipment at least one of:
   enables the evolved universal mobile telecommunications system terrestrial radio access network after receiving a location updating accept message from the non-legacy network, and
   reactivates with the evolved universal mobile telecommunications system terrestrial radio access network after receiving a routing area updating accept message from the non-legacy network.

4. The method of claim 1, further comprising:
   monitoring the network capabilities of the non-legacy access network to determine if one or more temporary network problems related to enhanced network capabilities have been resolved,
   in response to determining that the one or more temporary network problems have been resolved creating a status report containing updated status of the one or more temporary network problems.

5. The method of claim 1, wherein the network capability information element is at least one of:
   sent together with the location updating accept message; and
   sent together with the routing area updating accept message.

6. An apparatus, comprising:
   at least one processor; and
   at least one memory storing a computer program;
   in which the at least one memory with the computer program is configured with the at least one processor to cause the apparatus to at least:
   send an update message to a core network by a voice centric user equipment coupled to a legacy access network supporting circuit switched voice service, and
   receive an updating accept message containing a status report of possible enhanced network capabilities of a non-legacy access network,
   in response to receiving the status report of possible enhanced network capabilities determining whether to enable the non-legacy access network,
   monitor the network capabilities of the non-legacy access network to determine if one or more temporary network problems related to enhanced network capabilities have been resolved, and
   in response to determining that the one or more temporary network problems have been resolved, creating a status report containing updated status of the one or more temporary network problems.

7. The apparatus of claim 6, wherein the legacy access network is a global system for mobile communication/enhanced data rates for global evolution access network or universal mobile telecommunications system terrestrial access network and the non-legacy access network is a evolved universal mobile telecommunications system terrestrial access network.

8. The apparatus of claim 7, wherein the voice centric user equipment at least one of:
   enables the evolved universal mobile telecommunications system terrestrial radio access network after receiving a location updating accept message from the non-legacy network, and reactivates with the evolved universal mobile telecommunications system terrestrial radio access network after receiving a routing area updating accept message from the non-legacy network.

9. The apparatus of claim 6, wherein the status report is a network capability information element comprising:
an availability of a circuit switch fallback mechanisms;
an availability of a single radio call continuity mechanisms;
an availability of an Internet protocol multimedia subsystem, and
an availability of a voice over long term evolution via generic access mechanism.

10. The apparatus of claim 9, wherein the circuit switch fallback mechanisms comprises:
a 1× circuit switch fallback mechanism;
a universal mobile telecommunications system terrestrial radio network circuit switch fallback mechanism;
a global system for mobile communication/enhance data rate for global evolution radio access network circuit switch fallback mechanism; and
a short message service circuit switch fallback mechanism.

11. The apparatus of claim 9, wherein the network capability information element is at least one of:
sent together with the location updating accept message, and
sent together with the routing area updating accept message.

12. A program storage device readable by a machine, tangibly embodying a program of instructions executable by the machine for performing operations, said operations comprising:
sending an update message to a core network by a voice centric user equipment coupled to a legacy access network supporting circuit switched voice service; and
receiving an updating accept message containing a status report of possible enhanced network capabilities of a non-legacy access network,
in response to receiving the status report of possible enhanced network capabilities determining whether to enable the non-legacy access network,
enabling the legacy access network after receiving a location updating accept message from the non-legacy network, based on the determination, and
reactivating with the legacy access network after receiving a routing area updating accept message from the non-legacy network.

13. The program storage device of claim 12, wherein the legacy access network is a global system for mobile communication/enhanced data rates for global evolution access network or universal mobile telecommunications system terrestrial access network and the non-legacy access network is a evolved universal mobile telecommunications system terrestrial access network.

14. The program storage device of claim 12, said operations further comprising:
monitoring the network capabilities of the non-legacy access network to determine if one or more temporary network problems related to enhanced network capabilities have been resolved,
in response to determining that the one or more temporary network problems have been resolved creating a status report containing updated status of the one or more temporary network problems.

15. The program storage device of claim 12, wherein the status report is a network capability information element comprising:
an availability of a circuit switch fallback mechanisms;
an availability of a single radio call continuity mechanisms;
an availability of an Internet protocol multimedia subsystem, and
an availability of a voice over long term evolution via generic access mechanism.

16. A method, comprising:
determining a type of service requested of a network;
in response to determining that the type of service is one or more data services, determining whether reactivation of an evolved universal mobile telecommunications system terrestrial radio access network based upon the level of service required for the data service type;
in response to determining that the type of service request is one or more voice services, determining whether reactivation of an evolved universal mobile telecommunications system terrestrial radio access network based upon the level of service required for the voice service type.

17. The method of claim 16, wherein the type of data is determined analyzing a quality of service a data or voice request made by user equipment.

18. The method of claim 17, wherein the network analyzes at least one of:
the one or more data or services based upon the level of service for specific data or voice types as described by its unique quality of service class identifier number, and
the one or more data or services based upon the level of service for specific data or voice types as described by a priority of the voice or data type, a packet delay budget, a packet error loss, allocation and retention policy, guarantee bit rate, or maximum bit rate.

19. The method of claim 16, wherein Internet protocol packet analysis is employed to determine if the one or more data services requires reactivation of the evolved universal mobile telecommunications system terrestrial radio access network.

20. The method of claim 19, wherein at least one of the Internet protocol packet analysis involves examining the Internet protocol address and port address of the one or more data services, and
a filter disposed in at least one of the user equipment and the packet data network gateway performs the Internet protocol packet analysis.

21. The method of claim 16, further comprising:
monitoring the network capabilities of the network to determine if Internet protocol multimedia subsystem, a circuit switch fallback mechanism and a single radio call continuity mechanism are available.

22. An apparatus, comprising:
at least one processor; and
at least one memory storing a computer program;
in which the at least one memory with the computer program is configured with the at least one processor to cause the apparatus to at least:
determine a type of service requested of a network;
in response to determining that the type of service is one or more data services, determining whether reactivation of an evolved universal mobile telecommunications system terrestrial radio access network based upon the level of service required for the data service type;
in response to determining that the type of service request is one or voice services, determining whether reactivation of an evolved universal mobile telecommunications system terrestrial radio access network based upon the level of service required for the voice service type.

23. The apparatus of claim 22, wherein the type of data is determined analyzing a quality of service a data or voice request made by user equipment.

24. The apparatus of claim 22, wherein the network analyzes at least one of:
the one or more data or services based upon the level of service for specific data or voice types as described by its unique quality of service class identifier number, and
the one or more data or services based upon the level of service for specific data or voice types as described by a priority of the voice or data type, a packet delay budget, a packet error loss, allocation and retention policy, guarantee bit rate, or maximum bit rate.

25. The apparatus of claim 22, wherein an Internet protocol packet analysis is at least one of:
employed to determine if the one or more data services requires reactivation of the evolved universal mobile telecommunications system terrestrial radio access network, and involves examining the Internet protocol address and port address of the data service request.

26. The apparatus of claim 22, where the at least one processor is further configured to cause the apparatus to at least:
monitor the network capabilities of the network to determine if Internet protocol multimedia subsystem, a circuit switch fallback mechanism and a single radio call continuity mechanism are available.

27. A program storage device readable by a machine, tangibly embodying a program of instructions executable by the machine for performing operations, said operations comprising:
determining a type of service requested of a network;
in response to determining that the type of service is one or more data services, determining whether reactivation of an evolved universal mobile telecommunications system terrestrial radio access network based upon the level of service required for the data service type;
in response to determining that the type of service request is one or more voice services, determining whether reactivation of an evolved universal mobile telecommunications system terrestrial radio access network based upon the level of service required for the voice service type.

28. The program storage device of claim 27, wherein the type of data is determined by analyzing a quality of service a data or voice request made by user equipment.

29. The program storage device of claim 27, wherein the network analyzes at least one of:
the data or service request based upon the level of service for specific data or voice types as described by its unique quality of service class identifier number, and
the one or more data or services based upon the level of service for specific data or voice types as described by a priority of the voice or data type, a packet delay budget, a packet error loss, allocation and retention policy, guarantee bit rate, or maximum bit rate.

30. The program storage device of claim 27, wherein Internet protocol packet analysis is at least one of:
employed to determine if the one or more data services requires reactivation of the evolved universal mobile telecommunications system terrestrial radio access network, and
involves examining the Internet protocol address and port address of the one or more data services.

31. The program storage device of claim 27, further comprising:
monitoring the network capabilities of the network to determine if Internet protocol multimedia subsystem, a circuit switch fallback mechanism and a single radio call continuity mechanism are available.

* * * * *